US011599606B2

(12) United States Patent
Yoshida et al.

(10) Patent No.: US 11,599,606 B2
(45) Date of Patent: Mar. 7, 2023

(54) MANAGEMENT DEVICE, MANAGEMENT METHOD, AND MANAGEMENT PROGRAM

(71) Applicant: NIPPON TELEGRAPH AND TELEPHONE CORPORATION, Tokyo (JP)

(72) Inventors: Yoshihiro Yoshida, Tokyo (JP); Tsuneko Kura, Tokyo (JP); Junko Hashimoto, Tokyo (JP); Shinya Takada, Tokyo (JP); Koji Kishi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 119 days.

(21) Appl. No.: 17/058,604

(22) PCT Filed: May 24, 2019

(86) PCT No.: PCT/JP2019/020687
§ 371 (c)(1),
(2) Date: Nov. 24, 2020

(87) PCT Pub. No.: WO2019/230594
PCT Pub. Date: Dec. 5, 2019

(65) Prior Publication Data
US 2021/0216615 A1    Jul. 15, 2021

(30) Foreign Application Priority Data
May 30, 2018 (JP) .............................. JP2018-103945

(51) Int. Cl.
*G06F 21/31* (2013.01)
*G06F 21/60* (2013.01)
*G06F 21/62* (2013.01)

(52) U.S. Cl.
CPC ............ *G06F 21/31* (2013.01); *G06F 21/604* (2013.01); *G06F 21/62* (2013.01); *G06F 2221/2141* (2013.01)

(58) Field of Classification Search
CPC ........ G06F 21/31; G06F 21/604; G06F 21/62; H04L 63/102; H04L 63/20; H04L 63/10
See application file for complete search history.

(56) References Cited

U.S. PATENT DOCUMENTS 6,275,825 B1 * 8/2001 Kobayashi ............ G06F 21/604
705/52
9,801,066 B1 * 10/2017 Hanley .............. G06Q 20/1085
(Continued)

FOREIGN PATENT DOCUMENTS

JP    5787931 B2    8/2015

OTHER PUBLICATIONS

C. Merritt and V. Y. Yoon, "The Employer Perspective of Managing Access to Federated Systems and the Need for an Ontological Approach," in IEEE Transactions on Engineering Management, pp. 1-17, 2020. (Year: 2020).*

(Continued)

*Primary Examiner* — Kari L Schmidt

(57) ABSTRACT

A management apparatus (20) includes: a storage unit (21) which stores user attribute information that associates a user who manages information related to crises and an attribute of the user with each other, correspondence information that associates the attribute and an external system of which the attribute is login-enabled with each other, and login information with respect to each external system; an external login information processing unit (223) which, when receiving a login request to an external system from a user, refers to the user attribute information, the correspondence information, and the login information stored in the storage unit, acquires an attribute of the user, and acquires information on (Continued)

an external system to which the acquired attribute is login-enabled; and an external login processing unit (224) which executes a login to an external system to which a login has been requested among the login-enabled external systems.

20 Claims, 17 Drawing Sheets

(56) References Cited

U.S. PATENT DOCUMENTS

| | | | | |
|---|---|---|---|---|
| 2003/0225827 A1* | 12/2003 | Andersen | H04L 9/40 | 709/203 |
| 2005/0015490 A1* | 1/2005 | Saare | H04L 63/0815 | 709/225 |
| 2005/0033716 A1* | 2/2005 | Ambroz | G06F 16/29 | |
| 2005/0283614 A1* | 12/2005 | Hardt | H04L 9/321 | 713/182 |
| 2007/0032225 A1* | 2/2007 | Konicek | F24F 11/30 | 455/417 |
| 2007/0169204 A1* | 7/2007 | Janakiraman | H04L 63/102 | 726/28 |
| 2008/0072285 A1* | 3/2008 | Sankaran | H04L 67/535 | 726/2 |
| 2008/0184336 A1* | 7/2008 | Sarukkai | G06F 21/6218 | 726/1 |
| 2009/0089254 A1* | 4/2009 | Von Kaenel | G06Q 40/08 | |
| 2012/0023561 A1* | 1/2012 | Saida | G06F 21/31 | 726/6 |
| 2013/0254875 A1* | 9/2013 | Sama | G06F 21/31 | 726/19 |
| 2013/0305314 A1* | 11/2013 | Niimura | G06F 21/608 | 726/3 |
| 2015/0087303 A1* | 3/2015 | Hillary | H04W 12/64 | 455/435.1 |
| 2015/0319102 A1* | 11/2015 | Esdaile | H04L 67/535 | 709/225 |
| 2015/0324579 A1* | 11/2015 | Qian | H04L 63/083 | 726/6 |
| 2016/0182565 A1* | 6/2016 | Salvador | H04L 63/08 | 726/1 |
| 2016/0300054 A1* | 10/2016 | Turgeman | G06F 21/36 | |
| 2017/0048253 A1* | 2/2017 | Anton | H04L 63/20 | |
| 2018/0027413 A1* | 1/2018 | Hanley | G06Q 20/1085 | 726/7 |

OTHER PUBLICATIONS

J. Carretero, G. Izquierdo-Moreno, M. Vasile-Cabezas and J. Garcia-Blas, "Federated Identity Architecture of the European eID System," in IEEE Access, vol. 6, pp. 75302-75326, 2018. (Year: 2018).*

Jeny Teheran, Dave Dykstra, and Mine Altunay. 2016. Bringing Federated Identity to Grid Computing. In Proceedings of the 11th Annual Cyber and Information Security Research Conference (CISRC '16). Association for Computing Machinery, New York, NY, USA, Article 10, 1-8. (Year: 2016).*

* cited by examiner

Fig. 2

| USER ID | NAME | KANA NOTATION OF NAME | LOGIN ID | PASSWORD | EMAIL ADDRESS | REGISTRATION DATE/TIME | ABOLITION DATE/TIME | ... |
|---|---|---|---|---|---|---|---|---|
| 1 | TARO YAMADA | TARO YAMADA | yamada.taro | R43f8+y% | yamada.taro@foo.or.jp | 2018/4/1 13:32 | | ... |
| 2 | HANAKO SATO | HANAKO SATO | sato.hanako | pXlj0GYa | sato.hanako@foo.or.jp | 2018/4/1 13:35 | | ... |
| 3 | JIRO NAKAMURA | JIRO NAKAMURA | nakamura.jiro | y$Q18W#b | nakamura.jiro@foo.or.jp | 2018/4/1 13:37 | | ... |
| 4 | KEIKO MIZUNO | KEIKO MIZUNO | mizuno.keiko | $ng4*Th9 | mizuno.keiko@foo.or.jp | 2018/4/1 13:38 | | ... |
| 5 | HIDEO TAKAHASHI | HIDEO TAKAHASHI | takahashi.hideo | 8mGp23ea | takahashi.hideo@foo.or.jp | 2018/4/1 13:40 | | ... |
| ... | ... | ... | ... | ... | ... | ... | ... | ... |

| ATTRIBUTE ID | ATTRIBUTE NAME | ATTRIBUTE TYPE | REGISTRATION DATE/TIME | ABOLITION DATE/TIME | ... |
|---|---|---|---|---|---|
| 1 | CRISIS MANAGEMENT OFFICE | ORGANIZATION | 2018/4/1 9:00 | | ... |
| 2 | SUPERVISORY TEAM | ORGANIZATION | 2018/4/6 14:30 | | ... |
| 3 | A COMPANY CYBER TEAM | ORGANIZATION | 2018/4/6 14:35 | | ... |
| 4 | B COMPANY CYBER TEAM | ORGANIZATION | 2018/4/6 14:35 | | ... |
| 5 | INFORMATION TEAM | ORGANIZATION | 2018/4/6 14:40 | | ... |
| 6 | LEADER | QUALIFICATION | 2018/4/6 14:40 | | ... |
| 7 | SYSTEM ADMINISTRATOR | QUALIFICATION | 2018/4/6 14:40 | ... | ... |
| 8 | MANAGEMENT LAYER | QUALIFICATION | 2018/4/1 9:00 | ... | ... |
| ... | ... | ... | ... | ... | ... |

| USER ID | ATTRIBUTE ID | REGISTRATION DATE/TIME | ABOLITION DATE/TIME | ... |
|---|---|---|---|---|
| 1 | 1 | 2018/4/6 14:40 | | ... |
| 1 | 5 | 2018/4/6 14:40 | | ... |
| 1 | 8 | 2018/4/6 14:40 | | ... |
| 2 | 2 | 2018/4/6 14:40 | | ... |
| 2 | 6 | 2018/4/6 14:40 | | ... |
| 2 | 7 | 2018/4/6 14:40 | | ... |
| ... | ... | ... | ... | ... |

| CORRESPONDENCE INFORMATION ID | ATTRIBUTE ID | EXTERNAL LOGIN ID | REGISTRATION DATE/TIME | ABOLITION DATE/TIME | ... |
|---|---|---|---|---|---|
| 1 | 1 | 1 | 2018/4/1 13:32 | | ... |
| 2 | 5 | 3 | 2018/4/1 13:35 | | ... |
| 3 | 8 | 2 | 2018/4/1 13:35 | | ... |
| 4 | 3 | 3 | 2018/4/1 13:38 | | ... |
| 5 | 7 | 3 | 2018/4/1 13:40 | | ... |
| 6 | 1 | 2 | 2018/4/1 13:32 | | ... |
| ⋮ | ⋮ | ⋮ | ⋮ | ⋮ | ⋮ |

| EXTERNAL LOGIN ID | LOGIN ID | PASSWORD | OPERABLE SPATIAL DATA ID | REGISTRATION DATE/TIME | ABOLITION DATE/TIME | ... |
|---|---|---|---|---|---|---|
| 1 | GIS_tensai.taro | UWjwkES7AGJO | 1,2,3,4,5 | 2018/4/1 13:32 | | ... |
| 2 | GIS_typhoon.hanako | E7Bu84n6me | 1,4,6 | 2018/4/1 13:35 | | ... |
| 3 | | | | | | ... |

| SPATIAL DATA ID | SPATIAL DATA NAME | SPATIAL DATA TYPE | REGISTRATION DATE/TIME | ABOLITION DATE/TIME | ... |
|---|---|---|---|---|---|
| 1 | GIS_Toukousen_Bunpu1 | CONTOUR DISTRIBUTION | 2018/4/1 13:32 | | ... |
| 2 | GIS_TDenchu_Bunpu1 | TELEPHONE POLE DISTRIBUTION | 2018/4/1 13:35 | | ... |
| 3 | GIS_Ddenchu_Bunpu1 | POWER POLE DISTRIBUTION | 2018/4/1 13:38 | | ... |
| 4 | GIS_Uryo_Bunpu1 | RAINFALL DISTRIBUTION | 2018/4/1 13:41 | | ... |
| 5 | GIS_Unryo_Bunpu1 | CLOUD COVER DISTRIBUTION | 2018/4/1 13:44 | | ... |
| 6 | GIS_Kanbu_Jusyo1 | EXECUTIVE ADDRESSES | 2018/4/1 13:46 | | ... |
| ... | ... | ... | ... | ... | ... |

Fig. 8

| OPERATION LOG ID | USER ID | ATTRIBUTE ID | OPERATION | EXTERNAL LOGIN INFORMATION ID | PERFORMANCE RESULT (SUCCESSFULLY-ACCESSED SPATIAL DATA ID) | PERFORMANCE RESULT (UNSUCCESSFULLY-ACCESSED SPATIAL DATA ID) | OCCURRENCE DATE/TIME | ... |
|---|---|---|---|---|---|---|---|---|
| 1 | 1 | 1 | LOGIN SUCCESSFUL | 1 | | | 2018/8/4 01:29 | ... |
| 2 | 1 | 1,8 | ACQUISITION OF EXTERNAL LOGIN INFORMATION | 1,2 | | | 2018/8/4 02:29 | ... |
| 3 | 1 | 1,8 | PERFORMANCE OF EXTERNAL LOGIN | | 1 | | 2018/8/4 03:29 | ... |
| 4 | 1 | 1,8 | ACCESS TO SPATIAL DATA | | 3,4,5,6 | | 2018/8/4 03:49 | ... |
| 5 | 1 | 1,8 | LOGOUT SUCCESSFUL | 1 | | | 2018/8/4 04:29 | ... |
| ... | ... | ... | ... | ... | ... | ... | ... | ... |

| EXTERNAL LOGIN ID | LOGIN ID | PASSWORD | OPERABLE SPATIAL DATA ID |
|---|---|---|---|
| 1 | GIS_tensai.taro | UWjwkES7AGJO | 1,2,3,4,5 |
| 2 | GIS_typhoon.hanako | E7Bu84n6mc | 1,4,6 |
| 3 | | | |

Fig. 12

| LOGIN ID | | OPERABLE SPATIAL DATA | LOGIN SELECTION | |
|---|---|---|---|---|
| GIS_tensai.taro | GIS_typhoon.hanako | CONTOUR DISTRIBUTION | SELECT | ~C1 |
| GIS_tensai.taro | | TELEPHONE POLE DISTRIBUTION | SELECT | ~C2 |
| GIS_tensai.taro | | POWER POLE DISTRIBUTION | SELECT | ~C3 |
| GIS_tensai.taro | GIS_typhoon.hanako | RAINFALL DISTRIBUTION | SELECT | ~C4 |
| GIS_tensai.taro | | CLOUD COVER DISTRIBUTION | SELECT | ~C5 |
| | GIS_typhoon.hanako | EXECUTIVE ADDRESSES | SELECT | ~C6 |

M1

Fig. 14
(a)
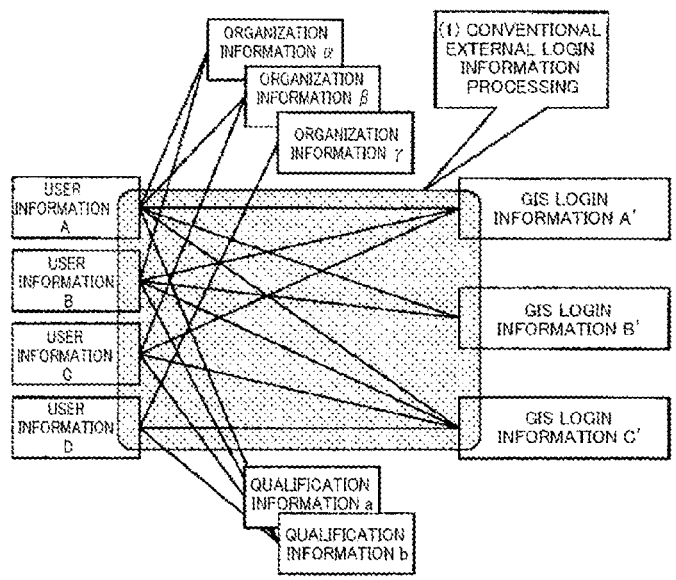
(b)
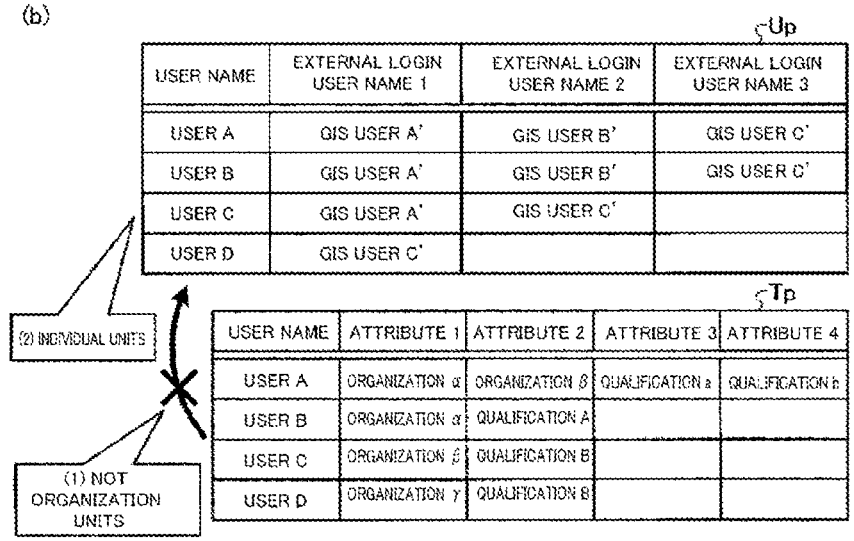

Fig. 15
(a)
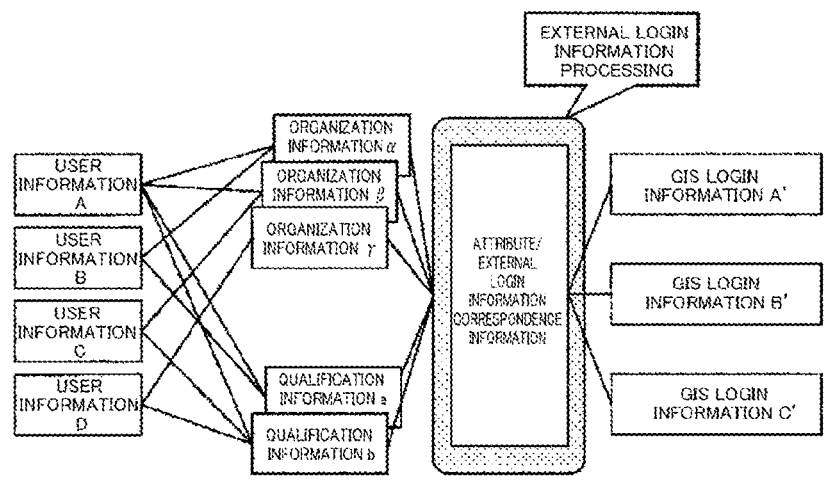
(b)
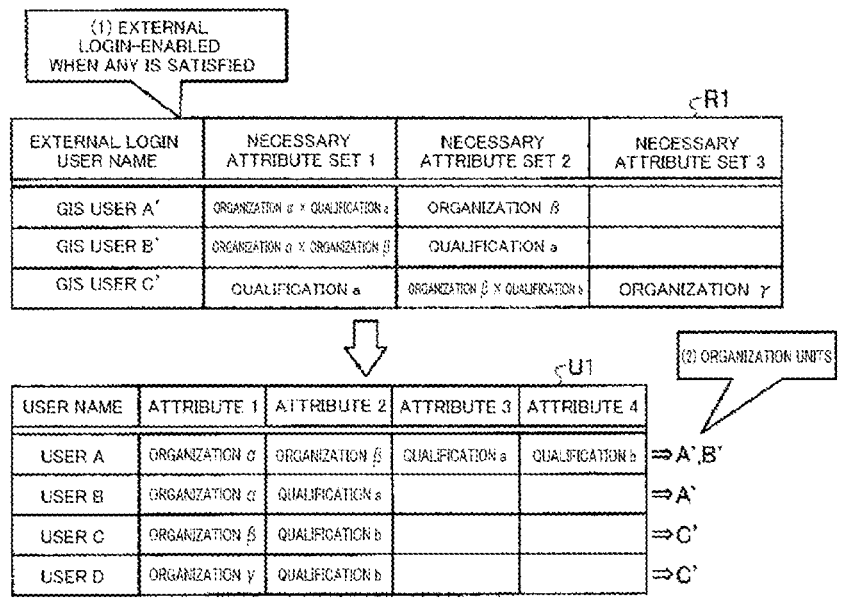

MANAGEMENT DEVICE, MANAGEMENT METHOD, AND MANAGEMENT PROGRAM

CROSS-REFERENCE TO RELATED APPLICATIONS

This application is a U.S. 371 Application of International Patent Application No. PCT/JP2019/020687, filed on 24 May 2019, which application claims priority to and the benefit of JP Application No. 2018-103945, filed on 30 May 2018, the disclosures of which are hereby incorporated herein by reference in their entireties.

TECHNICAL FIELD

The present invention relates to a management apparatus, a management method, and a management program.

BACKGROUND ART

Based on a geographical position, a geographic information system (GIS) comprehensively manages, processes, and visually displays data (spatial data) having information related to the position and enables sophisticated analysis to be carried out and quick decisions to be made. A method is proposed which, during a crisis response, uses the GIS to superimpose and display a plurality of pieces of spatial data on a map (refer to PTL 1). The use of this method enables crisis response sectors responsible for responding to crises such as natural disasters to analyze damage information and make crisis response decisions in an accurate and prompt manner.

CITATION LIST

Patent Literature

[PTL 1] Japanese Patent No. 5787931

SUMMARY OF THE INVENTION

Technical Problem

In some cases, data contained in individual pieces of spatial data prior to superposition may include sensitive information that corresponds to subtle information, personal information, or private information. Therefore, for each individual piece of spatial data, disclosure control must be performed in regards to whether or not the individual piece of spatial data should be displayed. In consideration thereof, the conventional method requires that disclosure control involving setting "an authority to display and operate a given piece of spatial data" be performed for each user account.

On the other hand, since the crisis response may become protracted, in order to fulfill allocated roles not only as individuals but also as an organization, individuals belonging to a same organization must be objects of disclosure control under same conditions. In this case, since an authority operation of all individuals belonging to the organization must be performed under same conditions for the number of individuals when user accounts are used in individual units with respect to the GIS, extremely cumbersome processing is required to perform authority operations in organization units.

In consideration thereof, a conceivable method involves using a shared user account with respect to the GIS. However, in the case of a method of using a shared user account, since records indicating who performed what kind of operation are not kept, it becomes impossible to clarify where responsibility lies. In addition, in the case of a method of using a shared user account, a risk of leakage of account information and nontraceability increase.

Furthermore, in a crisis response, an emergency organization that differs from a normal-time organization may be formed. Moreover, there are individuals that belong to a plurality of organizations such as those that perform double duty or those that belong to an executive organization.

Therefore, during a crisis response, with the conventional method, it is difficult to perform appropriate disclosure control while maintaining safety without affecting an existing GIS in such circumstances.

The present invention has been made in consideration of the circumstances described above and an object thereof is to provide a management apparatus, a management method, and a management program which enable appropriate disclosure control to be performed while maintaining safety without affecting existing external systems.

Means for Solving the Problem

In order to solve the problem and achieve the object described above, a management apparatus according to the present invention is a management apparatus which manages information related to crises and which performs disclosure control from a user to an external system, the management apparatus including: a storage unit which stores user attribute information that associates a user and an attribute of the user with each other, correspondence information that associates the attribute and an external system of which the attribute is login-enabled with each other, and login information with respect to each external system; a login information processing unit which, when receiving a login request to an external system from a user, refers to the user attribute information, the correspondence information, and the login information stored in the storage unit, acquires an attribute of the user, and acquires information on an external system to which the acquired attribute is login-enabled; and a login processing unit which executes a login to an external system to which a login has been requested among the login-enabled external systems acquired by the login information processing unit.

Effects of the Invention

According to the present invention, appropriate disclosure control can be performed while maintaining safety without affecting existing external systems.

BRIEF DESCRIPTION OF DRAWINGS

FIG. 2 is a diagram showing an example of a data configuration of a user information storage unit.

FIG. 3 is a diagram showing an example of a data configuration of an attribute information storage unit.

FIG. 4 is a diagram showing an example of a data configuration of a user attribute information storage unit.

FIG. 5 is a diagram showing an example of a data configuration of an external login correspondence information storage unit.

FIG. 6 is a diagram showing an example of a data configuration of an external login information storage unit.

FIG. 7 is a diagram showing an example of a data configuration of a spatial information storage unit.

FIG. 8 is a diagram showing an example of a data configuration of a log information storage unit.

FIG. 9 is a diagram showing an example of a list acquired by an external login information processing unit shown in FIG. 1.

FIG. 12 is a diagram showing an example of a screen of a client terminal.

FIG. 14 is a diagram illustrating login control to a GIS according to conventional art.

FIG. 15 is a diagram illustrating login control to a GIS according to an embodiment.

DESCRIPTION OF EMBODIMENTS

Hereinafter, a management apparatus, a management method, and a management program according to the present application will be described in detail with reference to the drawings. It is to be understood that the present invention is not limited to the embodiment described below. A case where the management apparatus according to the present invention is realized as an apparatus included in a crisis management system or as a function of the crisis management system will be described as an example.

Embodiment

[Outline of Crisis Management System]

In this case, a crisis management system refers to a system through which a crisis management office of a local municipality or a corporation supports management for responding to crises attributable to natural disasters such as earthquakes and typhoons and disasters caused by living organisms, radiation, nuclear weapons, explosives, cyberattacks, and the like. In addition, with respect to given crisis management, an object that bundles various crisis management response operations is defined as a board. Various pieces of information necessary to carry out crisis management are consolidated in the board. By outputting such information to a user, the crisis management system supports decision making and inter-organizational collaboration by the user. In addition, in the present embodiment, during a crisis response, in order to comprehensively manage or process and visually display spatial data to enable analyses to be performed and determinations to be made with respect to the crisis response, appropriate login control is performed while maintaining safety without affecting a GIS.

Figure 1:
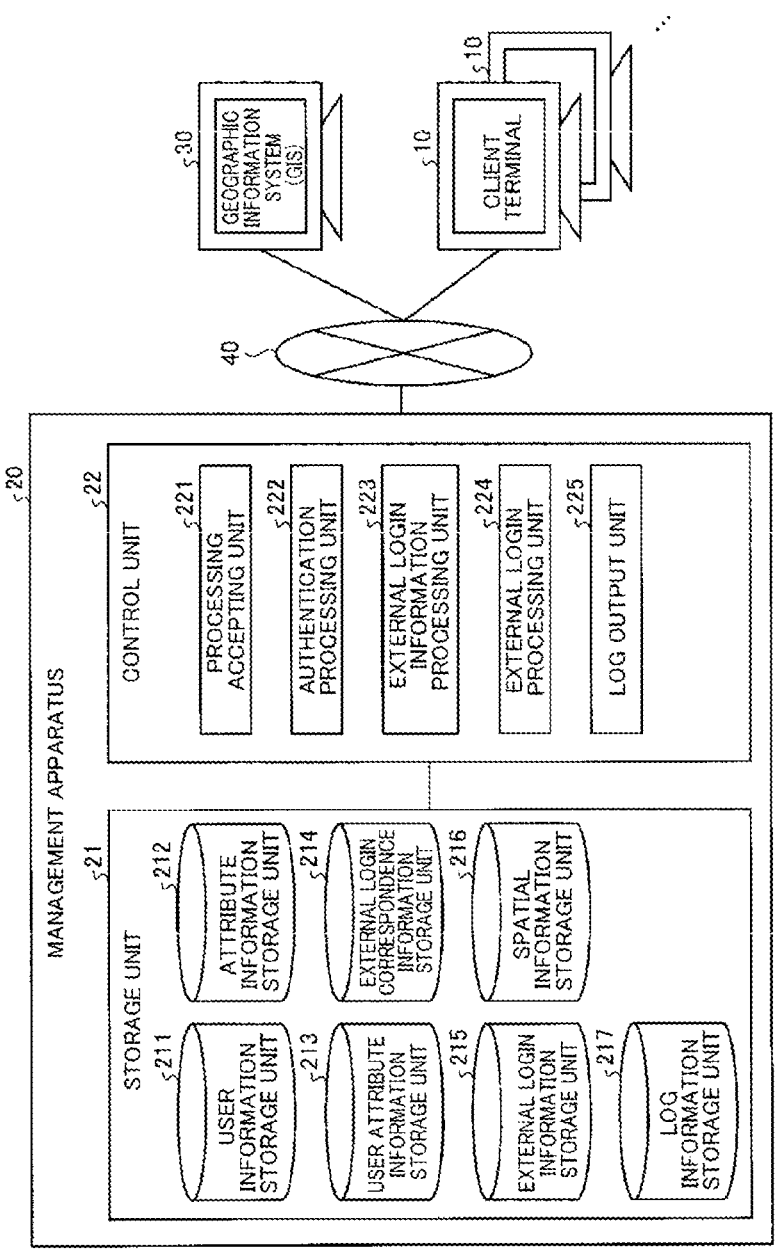
FIG. 1 is a diagram for illustrating an outline of a crisis management system.

FIG. 1 is a diagram for illustrating an outline of the crisis management system. As shown in FIG. 1, the crisis management system is configured such that a plurality of client terminals 10 and a management apparatus 20 are connected via a network 40. In addition, the management apparatus 20 is connected to a GIS 30 via the network 40. The management apparatus 20 may be provided at a same location as headquarters of a supervisory management organization that supervises and manages crises or may be provided at a location that differs from the supervisory management organization. In addition, the client terminals 10 are provided at the supervisory management organization as well as at each facility related to the supervisory management organization.

The GIS 30 manages spatial data. In addition, the spatial data of the GIS 30 can also be processed. In the GIS 30, disclosure information with respect to an authority that enables spatial data to be displayed and operated is defined in correspondence with each piece of login information.

The management apparatus 20 is, for example, a server apparatus. The management apparatus 20 manages crisis response information that indicates a response status of an organization to a crisis. By causing various screens representing crisis response information to be displayed on the client terminals 10 provided at subsidiary organizations, branches, and the like of response headquarters, the management apparatus 20 provides a user of each client terminal 10 with the crisis response information.

For each user of the client terminals 10, a correspondence relationship between attribute information such as a corresponding organization, qualifications, and authority and login information indicating feasibility of a login to the GIS 30 that is an external system is registered in the management apparatus 20. When the management apparatus 20 receives a login request to the GIS 30 from the client terminal 10, the management apparatus 20 controls a login to spatial data of the GIS 30 to which login is enabled depending on an organization to which the user of the client terminal 10 belongs or depending on qualifications or an authority of the user of the client terminal 10. Accordingly, the client terminal 10 becomes capable of referring to spatial data as well as executing processing including superimposing and displaying a plurality of pieces of spatial data on a map.

The client terminal 10 is, for example, a personal computer, a smartphone, or a mobile phone. The user can refer to or write onto the board via a web browser of each client terminal 10. In addition, the user makes a request to log into the external GIS 30 to the management apparatus 20 via the web browser of the client terminal 10. Once the user logs into the external GIS 30 in accordance with disclosure control by the management apparatus 20, the user uses the client terminal 10 to refer to and process spatial data, analyze damage information, and determine crisis response.

The network 40 need only be configured such that each of the connected apparatuses is capable of communicating with one another and may be constituted by the Internet, a LAN (Local Area Network), a WAN (Wide Area Network), or the like.

[Configuration of Management Apparatus]

The management apparatus 20 performs disclosure control to the GIS 30 by the client terminal 10 using attribute information indicating an organization to which the user belongs or qualifications or an authority of the user and using login correspondence information indicating the GIS 30 to which login is enabled in correspondence to the attribute information. In addition, the management apparatus 20 keeps records indicating which user had referred to and operated the GIS 30. Furthermore, by managing the attribute information and the login correspondence information, the management apparatus 20 also accommodates disclosure control to the GIS 30 when changes are made to users belonging to an organization and when an individual belongs to a plurality of organizations. In this manner, the management apparatus 20 performs appropriate disclosure control while maintaining safety without affecting the existing GIS 30.

First, a configuration of the management apparatus 20 will be described in detail. As shown in FIG. 1, the management apparatus 20 has a storage unit 21 and a control unit 22.

The storage unit 21 is realized by a semiconductor memory element such as a RAM (Random Access Memory) or a Flash Memory or a storage apparatus such as a hard disk or an optical disk and stores a processing program for operating the management apparatus 20, data to be used when the processing program is running, and the like.

When an operations manager is appointed to operate a crisis management system 1, the operations manager registers information necessary for crisis response such as organization information and user information in order to enable users to use the system. The storage unit 21 stores these pieces of information.

The storage unit 21 has a user information storage unit 211, an attribute information storage unit 212, a user attribute information storage unit 213, an external login correspondence information storage unit 214, an external login information storage unit 215, a spatial information storage unit 216, and a log information storage unit 217.

The user information storage unit 211 stores a user information table that indicates user information of the crisis management system 1. FIG. 2 is a diagram showing an example of a data configuration of the user information storage unit 211. As shown in a table T1 in FIG. 2, various pieces of information that corresponds to a user such as a user ID, a name, a kana notation of the name, a login ID, a password, an email address, a registration date/time, and an abolition date/time are registered in the user information table.

The attribute information storage unit 212 stores an attribute information table that indicates contents of attributes. For example, an organization for responding to crisis management of a given corporation is registered as an attribute. In addition, a qualification or an authority is registered as an attribute. FIG. 3 is a diagram showing an example of a data configuration of the attribute information storage unit 212. As shown in a table T2 in FIG. 3, an attribute ID, an attribute name, an attribute type, a registration date/time, an abolition date/time, and the like are registered in the attribute information table. For example, "crisis management office" has been registered at "2018/4/1 9:00" as an attribute type "organization" for the attribute ID "1". In addition, "leader" has been registered at "2018/4/6 14:40" as an attribute type "qualification" for the attribute ID "6".

The user attribute information storage unit 213 stores a user attribute information table that indicates attributes of each user. FIG. 4 is a diagram showing an example of a data configuration of the user attribute information storage unit 213. As shown in a table T3 in FIG. 4, a user ID, an attribute ID, a registration date/time, an abolition date/time, and the like are registered in the user attribute information table.

For example, attribute IDs "1", "5", and "8" are associated as attributes with a user with the user ID "1" (refer to first to third rows in the table T3). Therefore, in the tables T1 to T3, it is registered that "TARO YAMADA" with the user ID "1" belongs to an organization called an information team (attribute ID "5") of the crisis management office (attribute ID "1") and has a qualification of "leader". In this manner, by associating a plurality of attribute IDs to a single user ID, the management apparatus 20 is capable of managing users even when a single user belongs to a plurality of organizations.

The external login correspondence information storage unit 214 stores an external login correspondence table that associates an attribute with an external system of which the attribute is login-enabled. FIG. 5 is a diagram showing an example of a data configuration of the external login correspondence information storage unit 214. As shown in a table T4 in FIG. 5, an attribute ID, an external login ID, a registration date/time, an abolition date/time, and the like are registered in association with each correspondence information ID in the external login correspondence table. For example, it is registered in a correspondence information ID "1" that an attribute ID "1" is login-enabled to an external system with an external login ID of "1". In addition, it is registered that an attribute ID "5" is login-enabled to an external system with an external login ID of "3". Furthermore, regarding attribute IDs, one attribute may have two or more external login IDs. For example, as indicated in the correspondence information ID "6", it is registered that the attribute ID "1" is login-enabled to an external system with an external login ID of "2" in addition to the external system with the external login ID of "1".

The external login information storage unit 215 stores login information with respect to each external system. FIG. 6 is a diagram showing an example of a data configuration of the external login information storage unit 215. As shown in a table T5 in FIG. 6, a login ID, a password, an operable spatial data ID, a registration date/time, an abolition date/time, and the like are registered in association with each external login ID in the external login correspondence table. For example, in the case of an external login ID "1", operable spatial data IDs "1, 2, 3, 4, and 5" are associated with a login ID "GIS_tensai.taro" and a password "UWjwkES7AGJO".

The spatial information storage unit 216 stores information related to spatial data stored by the GIS 30. The spatial information storage unit 216 stores a spatial information table indicating names and types of spatial data stored by the GIS. FIG. 7 is a diagram showing an example of a data configuration of the spatial information storage unit 216. As shown in a table T6 in FIG. 7, a spatial data name, a spatial data type, a registration date/time, an abolition date/time, and the like are registered in association with each space ID in the spatial information table. For example, a spatial data lo ID "1" represents spatial data of which a spatial data name is "GIS_Toukousen_Bunpu1" and a spatial data type is "contour distribution".

The log information storage unit 217 stores an authentication result, operation contents, and the like of the management apparatus 20 as a log. For example, the log information storage unit 217 stores a log indicating a processing result of the management apparatus which accompanies a login request by the user.

FIG. 8 is a diagram showing an example of a data configuration of the log information storage unit 217. As shown in a table T7 in FIG. 8, an operation log ID, a user ID, an attribute ID, an operation, external login information, a performance result (a successfully-accessed spatial data ID), a performance result (an unsuccessfully-accessed spatial data ID), an occurrence date/time, and the like are registered. For example, an operation log "spatial data lo ID "2" indicates that an operation of external login information acquisition related to external login information IDs "1" and "2" has been processed at "2018/8/4 02:29" by a user with a user ID of "1" and attribute IDs of "1" and "8". In addition, an operation log spatial data lo ID "3" indicates that performance of a login to spatial data of "GIS_Toukousen-_Bunpu1" (contour distribution) with a spatial data lo ID "1" has been processed by the user with the user ID of "1" and the attribute IDs "1" and "8". In this manner, the management apparatus 20 keeps records indicating which user had referred to and operated the GIS 30 to secure safety of the operation.

The control unit 22 has an internal memory for storing a program that defines various processing procedures and required data and uses the processing procedures and required data to execute various types of processing. For example, the control unit 22 is an electronic circuit such as a CPU (Central Processing Unit) or an MPU (Micro Processing Unit). The control unit 22 has a processing accepting unit 221, an authentication processing unit 222, an external login information processing unit 223, an external login processing unit 224, and a log output unit 225.

The processing accepting unit 221 is constituted by an input/output interface. The processing accepting unit 221 receives operation data input by an operation of the client terminal 10, accepts the operation data, and outputs the operation data to various processing units.

For example, the processing accepting unit 221 accepts a login request to the present management apparatus 20 and a login request to the GIS 30 that is an external system. The processing accepting unit 221 outputs information processed by the control unit 22 such as information regarding a successful login or an unsuccessful login to the client terminal 10. In addition, when accepting a change request to change user information or a change request to change attributes of a user, the processing accepting unit 221 changes, in accordance with the change request, contents of a user information table (for example, the table T1) or a user attribute information table (for example, the table T2).

When the processing accepting unit 221 receives identification information such as a login ID or a password of the client terminal 10, the authentication processing unit 222 performs authentication based on information stored in the user information storage unit 211, the attribute information storage unit 212, and the user attribute information storage unit 213.

When the external login information processing unit 223 accepts a login request to the GIS 30 that is an external system from the user, the external login information processing unit 223 refers to user attribute information (for example, the table T3), the external login correspondence information (for example, the table T4), and the external login information (for example, the table T5) stored in the storage unit 21, acquires attributes of the user, and acquires information on the GIS 30 to which the acquired attributes are login-enabled. The external login information processing unit 223 acquires a list of external login users to which a user is login-enabled and a list of pieces of spatial data that are operable by the user.

Based on the list of external login users to which the user is login-enabled and the list of operable spatial data, the external login processing unit 224 executes a login to the spatial data of the GIS 30 to which the user having made the login request is login-enabled among login-enabled external systems.

The log output unit 225 outputs and records an authentication result, operation contents, and the like of the management apparatus 20 as a log to the log information storage unit 217. For example, the log output unit 225 records, as a log, a processing result of the management apparatus which accompanies a login request by the user on the log information storage unit 217.

[First Example of Login Processing to GIS]

Next, an example of processing until a user logs into the GIS 30 via the management apparatus 20 will be described. For example, a case where a login to the GIS 30 is requested from the client terminal 10 in the possession of the user "TARO YAMADA" (refer to first row of the table T1 shown in FIG. 2) with the user ID "1" will be described as an example.

When user authentication is performed by the authentication processing unit 222, the external login information processing unit 223 refers to the user information storage unit 211, the attribute information storage unit 212, and the user attribute information storage unit 213 and acquires attributes to which the user belongs. For example, attribute IDs "1", "5", and "8" are associated as attributes with the user "TARO YAMADA" with the user ID "1" (refer to first to third rows in the table T3 shown in FIG. 4).

Therefore, the external login information processing unit 223 refers to the table T2 and acquires crisis management office (attribute ID "1"), information team (attribute ID "5"), and management layer (attribute ID "8") as attributes to which "TARO YAMADA" with the user ID "1" belongs (refer to first, fifth, and eighth rows in the table T2 shown in FIG. 3).

Next, since the user "TARO YAMADA" with the user ID "1" has the attribute ID "1", the external login information processing unit 223 refers to the table T4 and acquires the external login ID "1" that corresponds to the user ID "1" (refer to first row in the table T4 shown in FIG. 3). In addition, the user "TARO YAMADA" with the user ID "1" also has the attribute ID "8" and therefore corresponds to the external login ID "2" (refer to third row in the table T4 shown in FIG. 3).

Subsequently, with respect to the external login ID "1" that corresponds to the user "TARO YAMADA", the external login information processing unit 223 refers to the table T5 and acquires a login ID "GIS_tensai.taro", a password "UWjwkES7AGJO", and operable space IDs "1, 2, 3, 4, and 5" which correspond to the external login ID "1". In addition, with respect to the external login ID "2" that corresponds to the user "TARO YAMADA", the external login information processing unit 223 refers to the table T5 and acquires a login ID "GIS_typhoon.hanako", a password "E7Bu84n6mc", and operable space IDs "1, 4, and 6" which correspond to the external login ID "1".

Based on the acquired external login IDs, the external login information processing unit 223 acquires information on the GISs 30 that are operable by the user. In doing so, as spatial data that corresponds to the external login ID "1", it is registered that a login is enabled to "GIS_Toukousen-_Bunpu1" (contour distribution) with a spatial data ID of "1", "GIS_TDenchu_Bunpu1" (telephone pole distribution) with a spatial data ID of "2", "GIS_Ddenchu_Bunpu1" (power pole distribution) with a spatial data ID of "3", "GIS_Uryo_Bunpu1" (rainfall distribution) with a spatial data ID of "4", and "GIS_Unryo_Bunpu1" (cloud cover distribution) with a spatial data ID of "5" (refer to first row of the table T5 and first to fifth rows of the table T6). Therefore, the external login information processing unit 223 acquires the spatial data IDs "1" to "5" as pieces of spatial data of the GIS 30 that are operable by the user "TARO YAMADA" with the user ID "1".

In addition, since the user "TARO YAMADA" with the user ID "1" also has the attribute ID "8", login is also enabled to spatial data "GIS_Kanbu_Jusyo1" (executive addresses) which corresponds to the external login ID "2" (refer to third row in table T4) and which has a spatial data ID of "6" (refer to second row of the table T5 and sixth row of the table T6). Therefore, the external login information processing unit 223 acquires the spatial data ID "6" as spatial data of the GIS 30 that is operable by the user "TARO YAMADA" with the user ID "1".

Next, the external login information processing unit 223 acquires a list of external login users to which the user "TARO YAMADA" is login-enabled and a list of pieces of spatial data of the GIS 30 that are operable by the user "TARO YAMADA".

FIG. 9 is a diagram showing an example of a list acquired by the external login information processing unit 223 shown in FIG. 1. As indicated in a list L1 shown in FIG. 9, the list has external login IDs to which users are login-enabled, login IDs, passwords, and operable spatial data IDs as items. In the list L1, the user "TARO YAMADA" includes login information related to a login to the spatial data IDs "1" to "5" using the external login ID "1" and a login to the spatial data ID "6" using the external login ID "2".

The external login unit 224 executes a login to the GIS 30 that is an external system in accordance with the list L1. Accordingly, the client terminal 10 used by the user "TARO YAMADA" logs into the GIS 30 via the management apparatus 20 and pieces of spatial data representing a contour distribution, a telephone pole distribution, a power pole distribution, a rainfall distribution, a cloud cover distribution, and executive addresses are automatically displayed.

[Processing Procedures of Login Processing to GIS]

Figure 10:
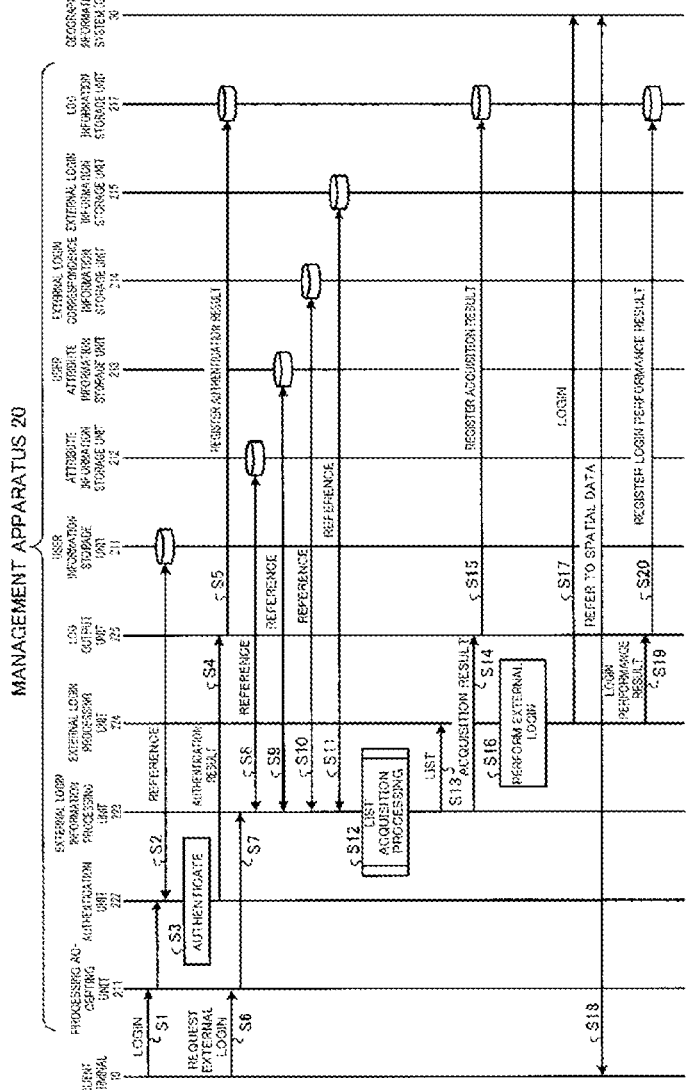
FIG. 10 is a sequence diagram showing an example of processing procedures of login processing to a GIS by a management apparatus shown in FIG. 1.

Next, an example of processing procedures of login processing to the GIS 30 by the management apparatus 20 will be described. FIG. 10 is a sequence diagram showing an example of processing procedures of login processing to the GIS 30 by the management apparatus 20 shown in FIG. 1.

As shown in FIG. 10, when the processing accepting unit 221 accepts a login by the client terminal 10 (step S1), the authentication processing unit 222 refers to the login information of the client terminal 10 and information stored in the user information storage unit 211 (step S2) and performs authentication with respect to the client terminal 10 (step S3). When the authentication processing unit 222 succeeds in authenticating the client terminal 10, the authentication processing unit 222 continues subsequent processing. When the authentication processing unit 222 fails to authenticate the client terminal 10, the authentication processing unit 222 returns an authentication failure to the client terminal 10. The authentication processing unit 222 outputs an authentication result to the log output unit 225 (step S4), and the log output unit 225 registers the authentication result in the log information storage unit 217 (step S5).

Next, when the processing accepting unit 221 accepts a login request from the client terminal 10 to the GIS 30 that is an external system (steps S6 and S7), the external login information processing unit 223 refers to the attribute information storage unit 212, the user attribute information storage unit 213, the external login correspondence information storage unit 214, and the external login information storage unit 215 (step S8 to step S11). In addition, the external login information processing unit 223 performs list acquisition processing (step S12).

In step S12, the external login information processing unit 223 acquires a list of external login users to which the user having made the login request to the GIS 30 is login-enabled and a list of pieces of spatial data of the GIS 30 that are operable by the user (for example, the list L1 shown in FIG. 9).

In addition, the external login information processing unit 223 outputs the acquired lists to the external login processing unit 224 (step S13). The external login information processing unit 223 outputs an acquisition result of the lists to the log output unit 225 (step S14), and the log output unit 225 registers the acquisition result in the log information storage unit 217 (step S15).

Subsequently, the external login processing unit 224 performs login processing to an external GIS 30 in accordance with the acquired lists (steps S16 and S17). As a result, the client terminal 10 can log into the GIS 30 via the management apparatus 20 and the user becomes capable of referring to spatial data on a screen of the client terminal 10 (step S18). The external login processing unit 224 outputs a login performance result to the log output unit 225 (step S19), and the log output unit 225 registers the login performance result in the log information storage unit 217 (step S20).

[Processing Procedures of External Login User List Acquisition Processing]

Figure 11:
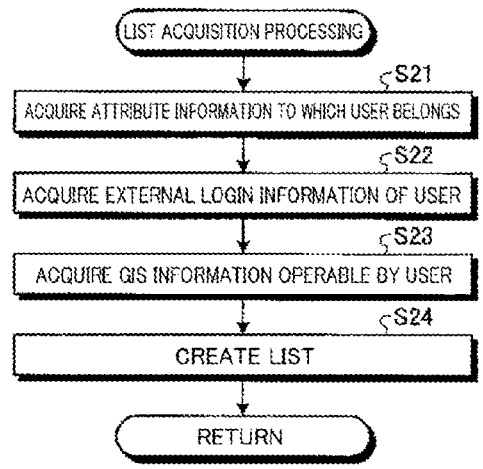
FIG. 11 is a flow chart showing processing procedures of list acquisition processing shown in FIG. 10.

Next, processing procedures of the list acquisition processing (step S12) will be described. FIG. 11 is a flow chart showing processing procedures of the list acquisition processing shown in FIG. 10.

As shown in FIG. 11, the external login information processing unit 223 acquires attribute information on attributes to which the user having made the external login request belongs based on data in the attribute information storage unit 212 and the user attribute information storage unit 213 which the external login information processing unit 223 has referred to (step S21). In doing so, the external login information processing unit 223 acquires attribute IDs of the user.

Next, the external login information processing unit 223 acquires external login information of the user based on the data in the external login correspondence information storage unit 214 and the external login information storage unit 215 (step S22). In doing so, the external login information processing unit 223 acquires a correspondence information ID of the user, an external login ID that corresponds to the correspondence information ID, and a login ID and a password that correspond to the external login ID.

In addition, based on data in the external login information storage unit 215, the external login information processing unit 223 acquires GIS information on a GIS that is operable by the user (step S23). In doing so, the external login information processing unit 223 acquires a spatial data ID in the GIS 30 that is operable by the user.

In addition, based on the acquired information, the external login information processing unit 223 creates a list of external login users to which the user is login-enabled and a list of pieces of spatial data in the GISs 30 that are operable by the user (step S24).

[Second Example of Login Processing to GIS]

Next, another example of processing until the user logs into the GIS 30 via the management apparatus 20 will be described. In the second example, a flow up to the acquisition of information on the GIS 30 that is operable by the user by the external login information processing unit 223 based on the acquired external login IDs is similar to that of the first example.

In this case, separate from the list L1 to be output to the external login processing unit 224, the external login information processing unit 223 creates a list of pieces of login-enabled spatial data to be presented to the user. FIG. 12 is a diagram showing an example of a screen of the client terminal 10.

For example, the external login information processing unit 223 creates a list displaying pieces of operable spatial data and selection buttons for selecting feasibility of execution of a login and causes the client terminal 10 of the user to display a menu M1 (refer to FIG. 12) including the list. In the menu M1, a login ID to login-enabled spatial data and a name of operable spatial data are associated with each other and displayed. Therefore, the menu M1 clearly shows which login ID can be used to log into which piece of spatial data. By operating the client terminal 10, the user selects selection buttons C1 to C6 of spatial data that the user desires to refer to.

For example, when the user wishes to refer to power pole distribution and cloud cover distribution, the user need only select the selection button C3 and the selection button C5 which correspond to these pieces of spatial data. The selection result is transmitted to the management apparatus 20 and, using a login ID and a password of the external login ID "1", the external login processing unit 224 logs into the spatial data "power pole distribution" (spatial data ID "3") and the spatial data "cloud cover distribution" (spatial data ID "5") in the GIS 30. As a result, the client terminal 10 of the user becomes capable of referring to the spatial data "power pole distribution" (spatial data ID "3") and the spatial data "cloud cover distribution" (spatial data ID "5").

[Another Example of Processing Procedures of Login Processing to GIS]

Figure 13:
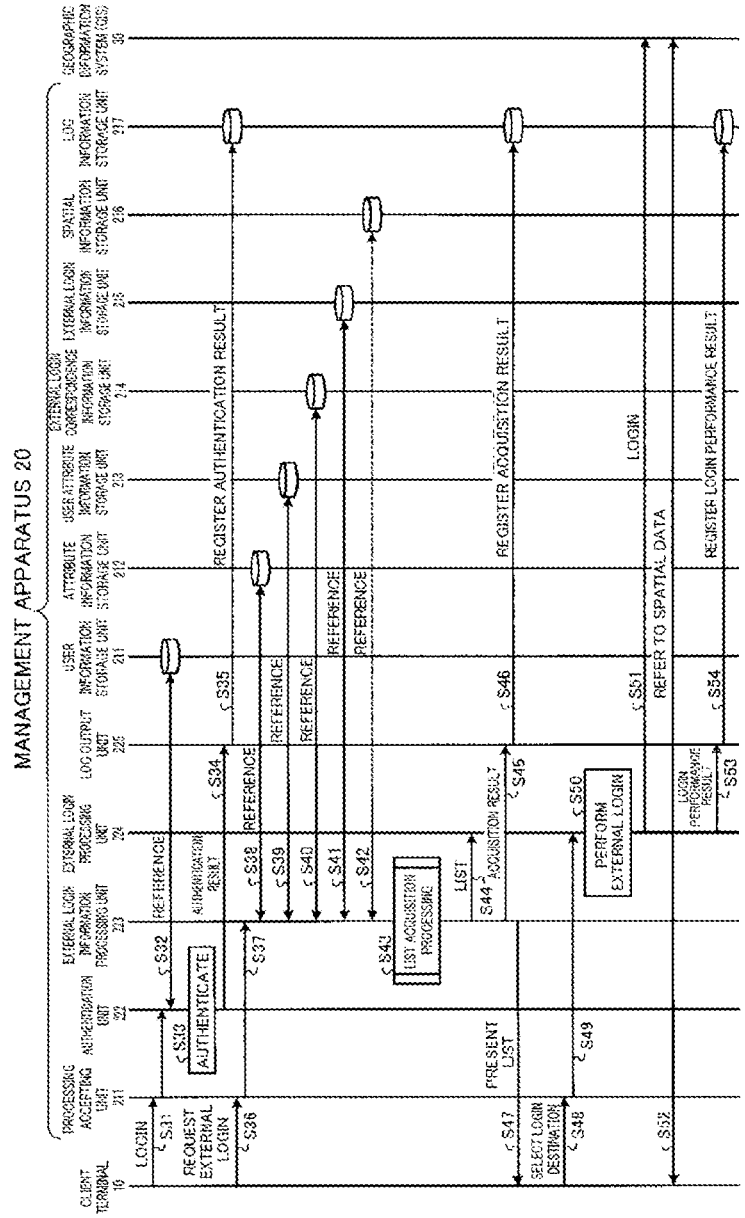
FIG. 13 is a sequence diagram showing another example of processing procedures of login processing to a GIS by the management apparatus shown in FIG. 1.

Next, another example of processing procedures of login processing to the GIS 30 by the management apparatus 20 will be described. FIG. 13 is a sequence diagram showing another example of processing procedures of login processing to the GIS 30 by the management apparatus 20 shown in FIG. 1.

Step S31 to step S37 shown in FIG. 13 are processing steps similar to step S1 to step S7 shown in FIG. 10. The external login information processing unit 223 refers to the attribute information storage unit 212, the user attribute information storage unit 213, the external login correspondence information storage unit 214, the external login information storage unit 215, and the spatial information storage unit 216 (step S38 to step S42).

In addition, the external login information processing unit 223 performs external login user list acquisition processing (step S43). In doing so, separate from the list L1 to be output to the external login processing unit 224, the external login information processing unit 223 creates a list of pieces of login-enabled spatial data to be presented to the user. Step S44 to step S46 shown in FIG. 13 are processing steps similar to step S13 to step S15 shown in FIG. 10.

The external login information processing unit 223 presents the client terminal 10 with a list of pieces of spatial data that are login-enabled (step S47). For example, the external login information processing unit 223 causes a menu enabling spatial data to be selected (for example, the menu M1 in FIG. 12) to be displayed on the screen of the client terminal 10. In response thereto, when a selection result of a login destination is output from the client terminal 10 (steps S48 and S49), the external login processing unit 224 performs a login to the GIS 30 so as to enable a login to be performed to the selected spatial data among the pieces of login-enabled spatial data in accordance with the selection result output from the client terminal 10 (steps S50 and S51).

As a result, the client terminal 10 can log into the GIS 30 via the management apparatus 20 and the user becomes capable of referring to spatial data selected by the user himself/herself on the screen of the client terminal 10 (step S52). Steps S53 and S54 shown in FIG. 13 are processing steps similar to steps S19 and S20 shown in FIG. 10.

Effects of Embodiment

As described above, the management apparatus 20 according to the present embodiment stores user attribute information that associates a user with attributes of the user, correspondence information that associates an attribute with the GIS 30 to which the attribute is login-enabled, and login information with respect to each GIS 30. In addition, when the management apparatus 20 accepts a login request to the GIS 30 from the user, the management apparatus 20 refers to user attribute information, external login correspondence information, and external login information, acquires attributes of the user, and acquires information on the GIS 30 to which the acquired attributes are login-enabled. Furthermore, the management apparatus 20 refers to login information, and by executing a login to spatial data of the GIS 30 to which a login has been requested among the login-enabled GIS 30, the management apparatus 20 performs disclosure control from the user to the GIS 30 in accordance with attributes such as organizations and qualifications.

A management method according to conventional art will now be compared with a management method according to the present embodiment. FIG. 14 is a diagram illustrating login control to the GIS 30 according to conventional art. FIG. 15 is a diagram illustrating login control to the GIS 30 according to an embodiment.

As shown in (a) in FIG. 14, in conventional external login information processing, a login is made to a GIS in defined user units using a user account (for example, GIS login information A') as represented by table Up (refer to (b) in FIG. 14). In this case, since a crisis response may involve fulfilling allocated roles in organization units over a long period of time, individuals belonging to a same organization must be objects of a same disclosure control. However, in conventional art, logins to GISs are controlled in individual units (refer to (2) in (b) in FIG. 14) instead of organization units (refer to (1) and a table Tp in (b) in FIG. 14).

In contrast, in the present embodiment, as shown in (a) in FIG. 15, since logins to GISs are controlled based on organization information and qualification information, disclosure control of spatial data on a GIS is performed in accordance with an organization, qualifications, or the like.

For example, as shown in (b) in FIG. 15, it is set in a table R1 that a login to an external GIS is enabled when any of necessary attribute sets (refer to the table R1 in (b) in FIG. 15) is satisfied (refer to (1) in (b) in FIG. 15). With respect to a login as an external login user A', a necessary attribute set 1 is constituted by an organization α and a qualification a and a necessary attribute set 2 is constituted by an organization β. Therefore, in the present embodiment, a login to an external GIS is controlled according to attributes of each user that are set in an attribute table U1.

For example, as shown in the attribute table U1 (refer to (b) in FIG. 15), since a user A has attributes of the organization α, the organization β, the qualification a, and a qualification b, a login to the GIS is enabled as external login users A' and B'. In addition, since a user B has attributes of the organization α and the qualification a, a login to the GIS is enabled as the external login user A'. In addition, since a user C has attributes of the organization β and the qualification b, a login to the GIS is enabled as an external login user C'. In addition, since a user D has attributes of an organization γ and the qualification b, a login to the GIS is enabled as the external login user C'. Therefore, the users A and B who belong to the same organization α are login-enabled to a GIS as the external login user A' and the users C and D who have the same qualification b are login-enabled to a GIS as the external login user C'.

In this manner, in the present embodiment, due to disclosure control by the management apparatus 20, a login is enabled to a GIS in correspondence to an authority (qualifications) in organization units and in a state where the presence of individuals who simultaneously belong to a plurality of organizations is allowed (refer to (2) in (b) in FIG. 15). In other words, according to the present embodiment, a plurality of pieces of spatial data matching an organization to which a user having made a login request belongs or matching an authority of the user can be caused to be displayed on the client terminal 10 of the user and the user becomes capable of operating the plurality of pieces of spatial data. In addition, in the present embodiment, since the management apparatus 20 instead of users strictly manages login information including a password, a risk of leakage of account information to the outside is eliminated.

Therefore, according to the present embodiment, display and operations of the spatial data at the client terminal 10 can be appropriately controlled while maintaining safety in a state where the GIS 30 that is an existing external system is not affected.

Figure 16:
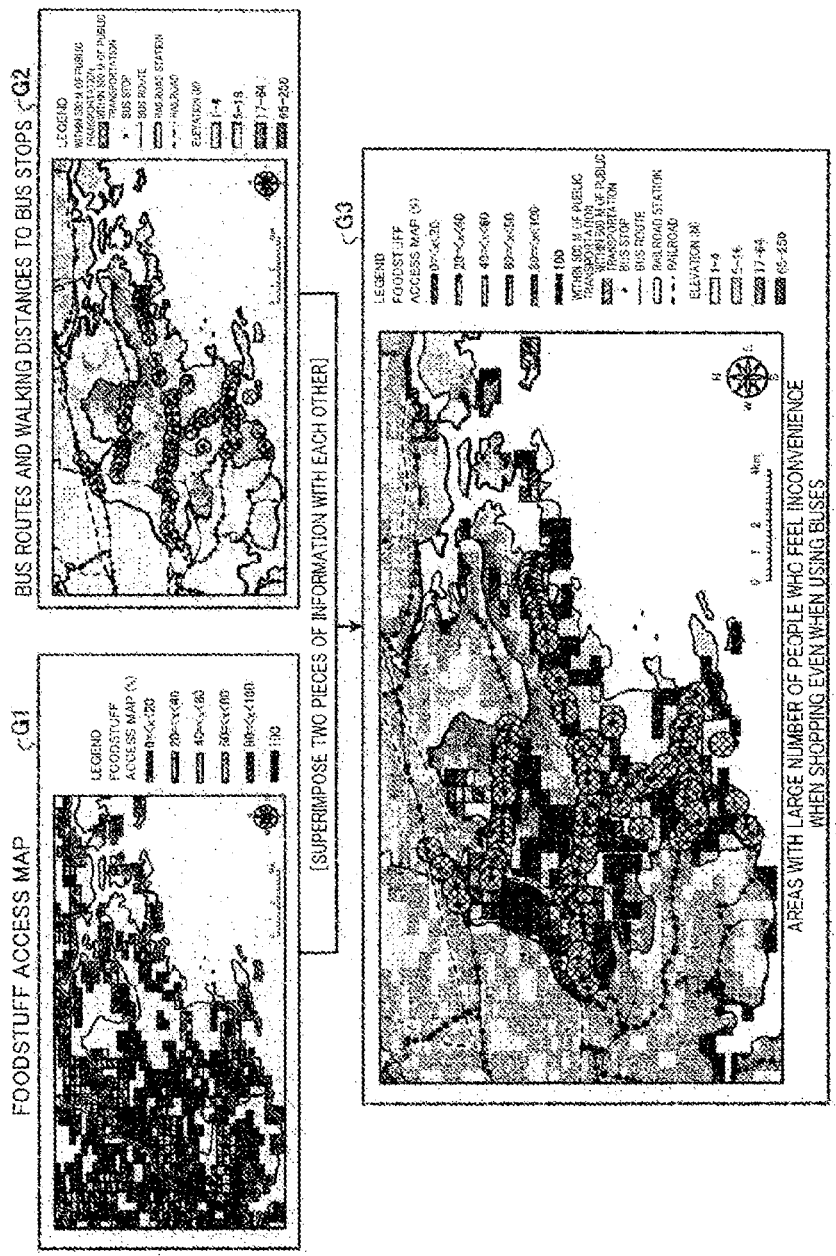
FIG. 16 is a diagram showing an example of a screen of a client terminal.

In addition, FIG. 16 is a diagram showing an example of the screen of the client terminal 10. Due to disclosure control by the management apparatus 20, a user having made a login request can refer to a plurality of pieces of spatial data matching an organization to which the user belongs or matching an authority of the user. In FIG. 16, a case where the user is capable of referring to two pieces of spatial data including a foodstuff access map G1 and a map G2 of bus routes and walking distances to bus stops in accordance with attributes will be illustrated as an example. In this example, the user can refer to, in parallel, both the foodstuff access map G1 and the map G2 of bus routes and walking distances to bus stops. In addition, by performing an operation of superimposing the two maps on top of each other, the user can create a map G3 showing areas with a large number of people who feel inconvenience when shopping even when using buses.

In addition, the management apparatus 20 stores, as a log, a processing result of the management apparatus 20 which accompanies a login request by a user. In other words, the management apparatus 20 keeps records on whether or not the user has referred to or operated a GIS 30. Therefore, by keeping records indicating which user had referred to and operated the GIS 30, the management apparatus 20 secures safety of an operation.

Furthermore, in the management apparatus 20, when the processing accepting unit 221 accepts a change request to change user information or a change request to change an attribute of a user, the processing accepting unit 221 changes contents of the user information storage unit 211 or the user attribute information storage unit 213 in accordance with the change request. Therefore, even when there is a change to an individual belonging to an organization, the management apparatus 20 can accommodate disclosure control to an external GIS 30. In other words, by newly defining attribute information such as an organization or qualifications, changing a definition thereof, deleting a definition thereof, or the like with respect to the management apparatus 20, a user can perform an external login in accordance with a state after the definition and can be given authority to display and operate spatial data. In doing so, when a plurality of external logins become enabled, the user can utilize the pieces of spatial data in a superimposed manner.

It is assumed that, by accommodating organizational concepts of a higher-level organization and a lower-level organization, the management apparatus 20 is capable of setting a definition in accordance with an organizational structure such as causing an authority that is allowed with respect to the higher-level organization to be also allowed with respect to the lower-level organization. In addition, it is assumed that the management apparatus 20 is capable of defining qualifications in accordance with mutual relationships among qualifications such as causing an authority that is allowed with respect to a lower-level qualification to be also allowed with respect to a higher-level qualification.

[System Configuration Etc.]

It is to be understood that each illustrated component of each apparatus is functional and conceptual and it is not required that each component of each apparatus be physically constructed as illustrated. In other words, specific modes of distribution and/or integration of each apparatus are not limited to the illustrated modes, and all or a part thereof can be functionally or physically distributed and/or integrated in arbitrary units in accordance with various loads, usage, or the like. Furthermore, all of or a part of each processing function that is carried out by each apparatus may be realized by a CPU and a program that is analyzed and executed by the CPU or may be realized as hardware based on wired logic.

In addition, among processing steps described in the present embodiment, all of or a part of processing steps described as being automatically performed may be performed manually, or all of or a part of processing steps described as being manually performed may be performed automatically using known methods. Furthermore, information including processing procedures, control procedures, specific names, and various types of data and parameters set forth in the description given above and in the drawings can be arbitrarily changed unless otherwise specified.

[Program]

Figure 17:
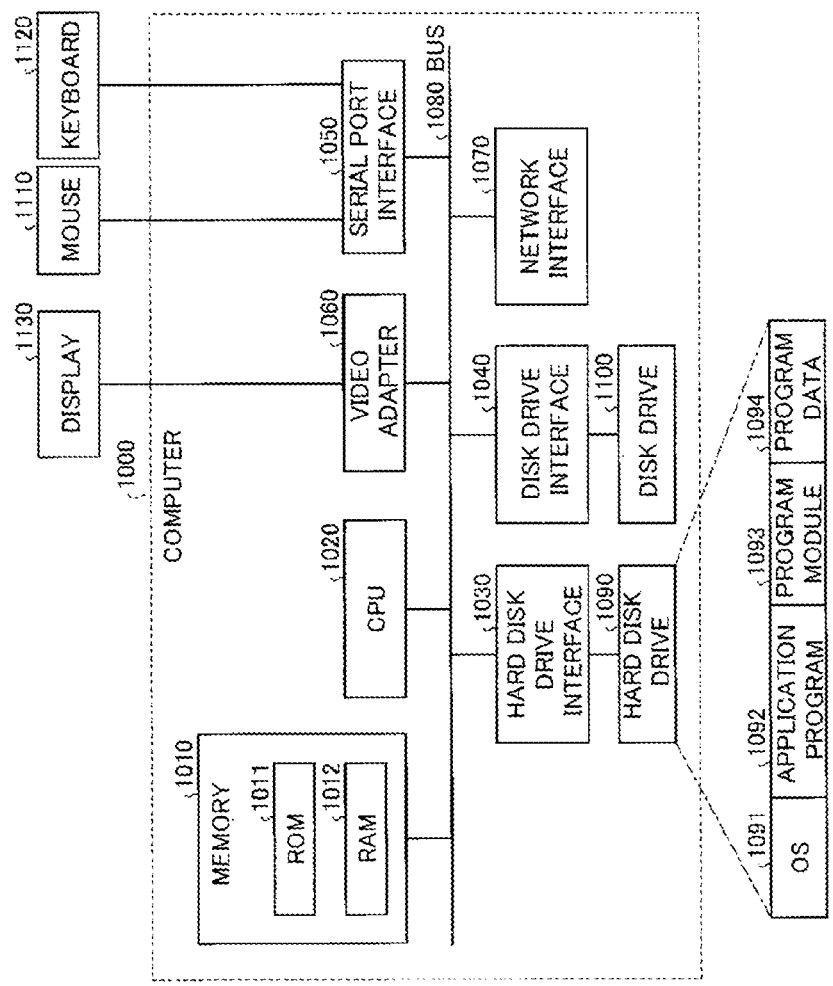
FIG. 17 is a diagram showing an example of a computer in which a management apparatus is realized by executing a program.

FIG. 17 is a diagram showing an example of a computer in which the management apparatus 20 is realized by executing a program. For example, a computer 1000 has a memory 1010 and a CPU 1020. In addition, the computer 1000 has a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM 1012. For example, the ROM 1011 stores a boot program such as a BIOS (Basic Input Output System). The hard disk drive interface 1030 is connected to a hard disk drive 1090. The disk drive interface 1040 is connected to a disk drive 1100. For example, an attachable/detachable storage medium such as a magnetic disk or an optical disk is inserted into the disk drive 1100. For example, the serial port interface 1050 is connected to a mouse 1110 and a keyboard 1120. For example, the video adapter 1060 is connected to a display 1130.

For example, the hard disk drive 1090 stores an OS 1091, an application program 1092, a program module 1093, and program data 1094. In other words, a program that defines various processing steps of the management apparatus 20 is implemented as the program module 1093 on which executable codes are described by the computer 1000. For example, the program module 1093 is stored in the hard disk drive 1090. For example, the program module 1093 for executing similar processing steps to the functional configuration of the management apparatus 20 is stored in the hard disk drive 1090. The hard disk drive 1090 may be replaced with an SSD (Solid State Drive).

In addition, setting data to be used in processing of the embodiment described above is stored as the program data 1094 in, for example, the memory 1010 or the hard disk drive 1090. Furthermore, the CPU 1020 loads the program module 1093 and the program data 1094 stored in the memory 1010 or the hard disk drive 1090 as necessary to the RAM 1012 and executes the program module 1093 and the program data 1094.

The program module 1093 and the program data 1094 are not limited to being stored in the hard disk drive 1090 and, for example, the program module 1093 and the program data 1094 may be stored in an attachable/detachable storage medium and read by the CPU 1020 via the disk drive 1100 or the like. Alternatively, the program module 1093 and the program data 1094 may be stored in another computer that is connected via a network (a LAN, a WAN, or the like). In addition, the program module 1093 and the program data 1094 may be read from the other computer by the CPU 1020 via the network interface 1070.

While an embodiment representing an application of the invention made by the present inventor has been described above, it is to be understood that the present invention is not limited by the descriptions and the drawings which constitute a part of the present invention as disclosed by the present embodiment. In other words, it is to be understood that the present invention includes all other embodiments, practical examples, operation techniques, and the like which will occur to those skilled in the art based on the present embodiment.

REFERENCE SIGNS LIST

10 Client terminal
20 Management apparatus
21 Storage unit
22 Control unit
30 Geographic information system (GIS)
40 Network
211 User information storage unit
212 Attribute information storage unit
213 User attribute information storage unit
214 External login correspondence information storage unit
215 External login information storage unit
216 Spatial information storage unit
217 Log information storage unit
221 Processing accepting unit
222 Authentication processing unit
223 External login information processing unit
224 External login processing unit
225 Log output unit

The invention claimed is:

1. A computer-implemented method for managing access to a system, the method comprising:
    interactively receiving a login request from a user for accessing the system, wherein the system processes data associated with a crisis;
    retrieving, based on the received login request, a combination of at least:
        user attribute information associating a user identity and a user attribute,
        correspondence information associating the user identity and one or more login-enabled systems for accessing by the user, wherein the one or more login-enabled systems include the system, and
        login information for accessing the one or more login-enabled systems based on the user identity, wherein the login information includes a login information of the system;
    retrieving, based on the user attribute associated with the user identity of the user, system information of the one or more login-enabled systems;
    transmitting, based on the retrieved system information associated with the one or more login-enabled systems, the login information of the system to the system, causing execution of a login operation based on the user identity of the user by the system to transmit the data associated with the crisis.

2. The computer-implemented method of claim 1, wherein the user identity is associated with a user accessing a first system, wherein the system identity relates to a second system, and wherein the second system is distinct from the first system.

3. The computer-implemented method of claim 1, the method further comprising:
    storing the combination of at least:
        the user attribute,
        the correspondence information, and
        the login information for accessing the system.

4. The computer-implemented method of claim 1, the method further comprising:
    generating a log, the log including a result of the received login request from the user; and
    storing the log.

5. The computer-implemented method of claim 1, the method further comprising:
    receiving a change request on the user attribute; and
    updating, based on the received change request, the user attribute.

6. The computer-implemented method of claim 1, wherein the user attribute includes an organization, a qualification, or an authority.

7. The computer-implemented method of claim 1, wherein the login information includes a login identifier for accessing the system, and wherein the user identifier is distinct from the login identifier for accessing the system.

8. A system for managing access to a system, the system comprises:
    a processor; and
    a memory storing computer-executable instructions that when executed by the processor cause the system to:
        interactively receiving a login request from a user for accessing the system, wherein the system processes data associated with a crisis;
        retrieving, based on the received login request, a combination of at least:
            user attribute information associating a user identity and a user attribute,
            correspondence information associating the user identity one or more login-enabled systems for accessing by the user, wherein the one or more login-enabled systems include the system, and
            login information for accessing the one or more login-enabled systems based on the user identity, wherein login information includes a login information of the system;
        Retrieving, based on the user attribute associated with the user identity of the user, system information of the one or more login-enabled systems;

transmitting, based on the retrieved system information associated with the one or more login-enabled systems, the login information of the system to the system, causing execution of a login operation based on the user identity of the user by the system to transmit the data associated with the crisis.

9. The system of claim 8, wherein the user identity is associated with a user accessing a first system, wherein the system identity relates to a second system, and wherein the second system is distinct from the first system.

10. The system of claim 8, the computer-executable instructions when executed further causing the system to:
storing the combination of at least:
the user attribute,
the correspondence information, and
the login information for accessing the system.

11. The system of claim 8, the computer-executable instructions when executed further causing the system to:
generating a log, the log including a result of the received login request from the user; and
storing the log.

12. The system of claim 8, the computer-executable instructions when executed further causing the system to:
receiving a change request on the user attribute; and
updating, based on the received change request, the user attribute.

13. The system of claim 8, wherein the user attribute includes an organization, a qualification, or an authority.

14. The system of claim 8, wherein the login information includes a login identifier for accessing the system, and wherein the user identifier is distinct from the login identifier for accessing the system.

15. A computer-readable non-transitory recording medium storing computer-executable instructions that when executed by a processor cause a computer system to:
interactively receiving a login request from a user for accessing the system, wherein the system processes data associated with a crisis;
retrieving, based on the received login request, a combination of at least:
user attribute information associating a user identity and a user attribute,
correspondence information associating the user identity and one or more login-enabled systems for accessing by the user, wherein the one or more login-enabled systems include the system, and
login information for accessing the one or more login-enabled systems based on the user identity, wherein the login information includes a login information of the system;
retrieving, based on the user attribute associated with the user identity of the user, system information of the one or more login-enabled systems;
transmitting, based on the retrieved system information associated with the one or more login-enabled systems, the login information of the system to the system, causing execution of a login operation based on the user identity of the user by the system to transmit the data associated with the crisis.

16. The computer-readable non-transitory recording medium of claim 15, wherein the user identity is associated with a user accessing a first system, wherein the system identity relates to a second system, and wherein the second system is distinct from the first system.

17. The computer-readable non-transitory recording medium of claim 15, the computer-executable instructions when executed further causing the system to:
storing the combination of at least:
the user attribute,
the correspondence information, and
the login information for accessing the system.

18. The computer-readable non-transitory recording medium of claim 15, the computer-executable instructions when executed further causing the system to:
generating a log, the log including a result of the received login request from the user; and
storing the log.

19. The computer-readable non-transitory recording medium of claim 15, the computer-executable instructions when executed further causing the system to:
receiving a change request on the user attribute; and
updating, based on the received change request, the user attribute.

20. The computer-readable non-transitory recording medium of claim 15, wherein the user attribute includes an organization, a qualification, or an authority, and wherein the login information includes a login identifier for accessing the system, and wherein the user identifier is distinct from the login identifier for accessing the system.

* * * * *